United States Patent [19]

Lacroix et al.

[11] Patent Number: 4,955,987

[45] Date of Patent: Sep. 11, 1990

[54] PROCESS FOR THE PREPARATION OF CONCENTRATED AQUEOUS, SUBSTANTIALLY SALT-FREE SOLUTIONS OF AMINOTRIAZINYL REACTIVE DYES, AQUEOUS DYE SOLUTIONS PRODUCED THEREBY AND PROCESS OF DYEING

[75] Inventors: Roger Lacroix, Village-Neuf; Edmond Ruhlmann, St. Louis, both of France

[73] Assignee: Ciba-Geigy Corporation, Ardsley, N.Y.

[21] Appl. No.: 805,601

[22] Filed: Dec. 6, 1985

[30] Foreign Application Priority Data

Dec. 7, 1984 [CH] Switzerland .......................... 5821/84

[51] Int. Cl.$^5$ .................... C09B 62/08; C09B 62/085; D06P 1/382; D06P 3/66
[52] U.S. Cl. .......................................... 8/549; 534/617; 534/618; 534/632; 534/633; 534/634; 534/635; 534/636; 534/637; 534/638; 534/583; 534/588; 534/887
[58] Field of Search ................ 534/617, 632, 633, 634, 534/635, 636, 637, 638, 887, 583, 588; 8/549

[56] References Cited

U.S. PATENT DOCUMENTS

| | | | |
|---|---|---|---|
| 3,621,008 | 11/1971 | Ross et al. | 534/583 X |
| 4,189,380 | 2/1980 | Booth et al. | 534/887 X |
| 4,314,818 | 2/1982 | Courtin | 534/637 X |
| 4,412,948 | 11/1983 | Omura et al. | 534/637 |
| 4,523,924 | 6/1985 | LaCroix | 534/887 X |
| 4,560,746 | 12/1985 | Rebhahn et al. | 534/887 X |

FOREIGN PATENT DOCUMENTS

| | | | |
|---|---|---|---|
| 0059782 | 9/1982 | European Pat. Off. | 534/887 |
| 0126830 | 12/1984 | European Pat. Off. | 534/887 |

*Primary Examiner*—Floyd D. Higel
*Attorney, Agent, or Firm*—Wenderoth, Lind & Ponack

[57] ABSTRACT

The invention describes a process for the preparation of concentrated aqueous, substantially salt-free solutions of aminotriazinyl reactive dyes, which process comprises starting from a dye which contains sulfo groups and one or more radicals capable of reaction with cyanuric halide, said dye being at least partly in the form of the ammonium salt, reacting said dye with cyanuric halide, in the presence of lithium hydroxide, and deionizing and concentrating the salt-containing synthesis solution by a membrane separation process.

The so prepared mixed lithium/ammonium salts of the acid aminotriazinyl reaction dyes are readily water soluble and are suitable for the preparation of concentrated storage stable dye solutions.

8 Claims, No Drawings

PROCESS FOR THE PREPARATION OF CONCENTRATED AQUEOUS, SUBSTANTIALLY SALT-FREE SOLUTIONS OF AMINOTRIAZINYL REACTIVE DYES, AQUEOUS DYE SOLUTIONS PRODUCED THEREBY AND PROCESS OF DYEING

The present invention relates to a process for the preparation of concentrated aqueous, substantially salt-free solutions of aminotriazinyl reactive dyes, to the dye solutions so obtained, and to the use thereof.

Compared with solid formulations such as powders or granules, liquid formulations of reactive dyes have a number of advantages, e.g. no dust formation when preparing the padding and dye liquors or printing pastes, no wetting problems caused by lump formation, no specky dyeings resulting from insufficiently dissolved dye particles. Not least because of these advantages, combined with the ease with which the liquid formulation can be added to the dyebath, there are available on the market today an increasing number of liquid formulations, with the trend favouring more concentrated solutions in view of the substantial savings that are possible as regards transportation and storage.

However, problems repeatedly arise in connection with the storage stability of dye solutions in general and concentrated formulations in particular. The more highly concentrated a dye solution is, the more easily recrystallisation occurs during storage, with the formation of larger or smaller agglomerates that prove exceedingly troublesome, e.g. when using such formations for textile printing, when they lead to the formation of specks on the dyed substrate.

Furthermore, the formation of a solid deposit is often observed. Such deposits can only be stirred with difficulty, so that the dye can no longer be completely dissolved.

There are various possibilities of increasing the solubility of anionic dyes and thus of improving the stability of dye solutions. A very essential measure consists in lowering the salt concentration, resulting from the synthesis, of the dye solution. This is achieved at present increasingly by means of membrane separation processes (q.v. for example European published patent application EP-A 00 59 782), in which a start can be made from the crude synthesis solutions as well as from the suspension of the dye filter cake.

However, it is often not possible to concentrate sufficiently even deionised dye solutions, or else concentrated solutions are obtained from which the dye precipitates irreversibly at storage temperatures in the region of freezing point. In such cases the addition of solubilisers may be of help; but these pass into the effluent after dyeing and pollute the purification plant. To avoid the use of such assistants, it is also possible to improve the water-solubility by converting the dye, which is normally salted out in the form of the sodium salt at the conclusion of the synthesis, into a more readily soluble salt, e.g. the lithium salt. This is accomplished e.g. by Donnan dialysis (e.q. European published patent application EP-A 0 126 830). In this elegant process, an acid dye can be converted almost completely from the sodium salt into the lithium salt form. The drawback of this process is, however, that fairly large amounts of dialysis solution are consumed.

Hence it is the object of the present invention to prepare readily water-soluble salts of reactive dyes of the aminotriazinyl series without using complicated apparatus.

Surprisingly, it has been found that the water-solubility of such dyes can be greatly improved by converting them into a mixed lithium/ammonium salt. This can be done in simple manner by starting from a non-reactive dye which contains sulfo groups and is at least partly in the form of the ammonium salt ($-SO_3^\ominus NH_4^\oplus$), and reacting said dye, in the presence of lithium hydroxide, with cyanuric halide (the reactive component). The salt-containing synthesis solution containing the final reactive dye is deionised by a membrane separation process and concentrated.

Accordingly, the present invention relates to a process for the preparation of concentrated aqueous, substantially salt-free solutions of aminotriazinyl reactive dyes, which process comprises starting from a dye which contains sulfo groups and one or more radicals capable of reaction with cyanuric halide, said dye being at least partly in the form of the ammonium salt, reacting said dye with cyanuric halide, in the presence of lithium hydroxide, and deionising and concentrating the salt-containing synthesis solution by a membrane separation process.

The mixed lithium/ammonium salts of the acid aminotriazinyl reactive dyes are about twice as readily water soluble as the corresponding sodium, potassium or ammonium salts. They are therefore preeminently suitable for the preparation of the concentrated dye solutions which are preferably used for continuous dyeing on account of the ease with which they can be added to the dyebath.

Suitable sulfo group containing dyes which can be reacted by the process of this invention with a cyanuric halide to give the corresponding reactive dyes are, in addition to disazo and polyazo dyes, preferably monoazo dyes. The azo dyes may be metallised as well as metal-free. It will, of course, be understood that acid anthraquinone, formazan, phthalocyanine of dioxazine dyes may also be reacted to fibre-reactive dye salts by the process of this invention.

A host of such dyes are known or can be prepared by known methods. It is essential that the dyes contain one or more suitable radicals capable of reacting with the cyanuric halide. Such radicals are in particular unsubstituted or monoalkylated amino groups such as the $-NH_2$, $-NHCH_3$, $-NHC_2H_5$ or $-NHC_3H_7$ group. These groups can be linked direct or through a bridge to the aromatic system of the dye. Suitable dyes are first and foremost dyes belonging to the following classes:

1. Monoazo dyes of the formula

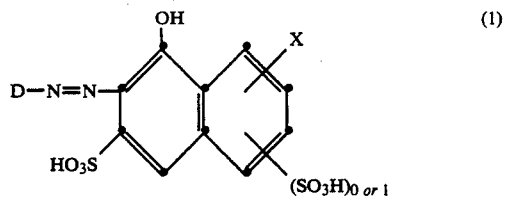

(1)

wherein D is a radical of the benzene or naphthalene series, e.g. a phenyl, naphthyl, stilbene, diphenyl, benzthiazolylphenyl or diphenylamino radical, each of which may be substituted by sulfo groups, halogen such as chlorine, alkylamino groups, e.g. ethylamino or methylamino, also by benzoylamino or the $-NH_2$ group, and further by alkoxy, e.g. methoxy, hydroxy or also carboxy, and X is an unsubstituted or alkylated amino group, e.g. —NH$_2$ or —NHCH$_3$, which is attached in position 5, 6, 7 or 8 of the naphthalene nucleus.

2. Monoazo dyes of the formula

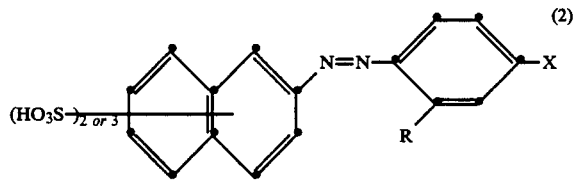

wherein X is as defined above and R is an amino group which is acylated by a C$_2$–C$_4$monocarboxylic acid, or is the ureido group.

3. Disazo dyes of the formula

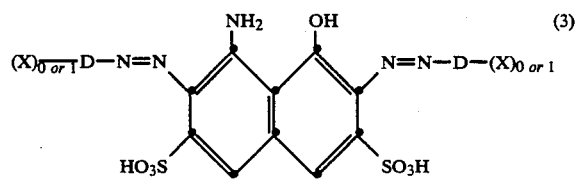

wherein the radicals D and X are as defined above.

4. Disazo dyes of the formula

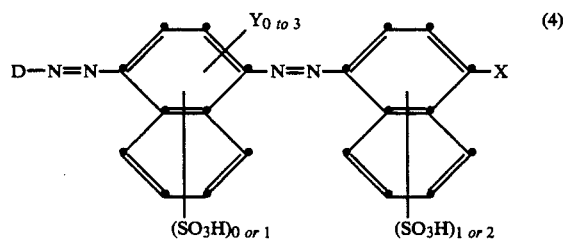

wherein the radicals D and X are as defined above and Y is a C$_1$–C$_4$alkyl group or C$_1$–C$_4$alkoxy group.

In the process of this invention it is preferred to react monoazo dyes of the structural formula indicated under (2) above with a cyanuric halide and then to process the reaction product to a storable liquid formulation.

It is an essential feature of the process of the present invention that only those dyes are used which contain at least 2 sulfo groups. It is preferred to use dyes which contain 2 to 5 sulfo groups, at least some of which sulfo groups are partly or wholly in the form of the ammonium salt. The ammonium salts of the dyes can be obtained in simple manner, for example by neutralising the acid synthesis solution of the dye with aqueous ammonia.

The cyanuric halide employed is preferably cyanuric fluoride and, most preferably, cyanuric chloride. In the course of the condensation reaction, one halogen atom of the cyanuric halide is replaced by the dye radical and a second one by an amino group. As the condensation reaction is carried out in the presence of lithium hydroxide, some of the sulfo groups are in the form of the lithium salt at the conclusion of the reaction. In other words, counterions of the sulfo groups (—SO$_3^\ominus$) of the aminotrioazinyl reactive dyes so obtained are lithium and ammonium cations. The lithium/ammonium content of the final dye can be regulated by the ammonium content of the starting dye and the amount of lithium hydroxide employed in the condensation reaction. The ratio of lithium to ammonium in the final dye is advantageously in the range from 1:1 to 3:1. In this ratio, dyes of very good water-solubility that have no propensity to flocculate or recrystallise in concentrated solutions are obtained.

At the conclusion of the condensation reaction, the dye precipitates in the form of a dilute aqueous synthesis solution or suspension which, in addition to containing the dye salt, contains a number of inert salts formed during the synthesis, e.g. alkali metal halides or alkali metal sulfates. These salts are removed from the dye solution or suspension by means of a membrane separation process, as a low salt content of the dye solution is of decisive importance of the storage stability of said solution. The aim will be to achieve almost complete salt removal, so that less than 1% by weight, preferably less than 0.5% by weight, of salt remains in the dye solution.

The term "membrane separation process" will be understood as meaning in the first line hyperfiltration. In contradistinction to conventional filtration, in which solid particles are separated from a liquid, this separation process is a selective molecular separation method. The membrane acts as a molecular sieve and is able to retain dissolved substances, if the molecular size is sufficient, on the contact surface of the membrane. It is convenient to use membranes with a cut-off level having a retention of at least 90% when these are subjected to hyperfiltration for 20 to 30 minutes. Such membranes are those having a cut-off level in the molecular weight range of 300 to 800, preferably of 400 to 500, and which are symmetrical or asymmetrical. They permit water and dissolved substances whose molecular weight is below the cut-off level to pass through under low to medium pressure. In the process of this invention, pressures of 10 to 100 bar, preferably of 10 to 30 bar, are applied.

The preferred membranes employed in the process of this invention on account of their good separating properties consist substantially of a polymeric material which is chiefly modified at the surface by acid or basic groups.

The polymeric material is a natural, regenerated or synthetic material which contains e.g. hydroxyl, amino and/or amidoxime groups as reactive groups. Such materials can be reacted with suitable reagents which, on the one hand, contain acid or basic groups and, on the other, at least one reactive group, to form a chemical (covalent) bond.

The acid groups are preferably carboxyl and sulfonic acid groups, and the basic groups are primarily secondary or tertiary amino groups, and also phosphonium or sulfonium groups.

The following polymeric compounds, for example, may be modified in the indicated manner:
cellulose acetates, e.g. those having a low content of acetyl groups, but also higher acylated cellulose, e.g. 2½-acetate, or
polyvinyl alcohols, or
polyacrylonitrile and copolymers of acrylonitrile and other monomers having ethylenic unsaturation.

Suitable reactive reagents which contain an acid or basic group are colourless and coloured compounds, preferably reactive dyes which may belong to different classes, e.g. anthraquinone, azo or formazan dyes. They may also be in the form of metal complexes.

Particularly useful and versatile polymer membranes are those which are modified by an azo dye which contains sulfonic acid groups. The azo dye may also contain a complexed metal, e.g. copper. Such membranes are described e.g. in German Offenlegungsschrift specifications 25 05 254 and 30 35 134 and in European patent application 26399.

The membranes employed in the process of this invention preferably have a pore diameter of 0.1 to 50 nm.

Further suitable membranes by means of which good salt removal is achieved are e.g. those based on unmodified or modified polysulfone, polyamide or polystyrene.

In a single passage through the membrane, the degree of purification and/or salt removal may be up to 70% and more, without noticeable loss of dye. Moreover, the volume of the solution of the retained substances (in the concentrate) decreases correspondingly and the concentration of the retained portion increases.

Before the membrane separation process, the synthesis solution preferably has a solids content of 5 to 15% by weight and concentration is effected until the solids content has risen to 20-50%.

The membrane separation process is advantageously carried out such that, initially, the dye solution or suspension is deionised almost completely. This is achieved by replacing the separated permeate by the corresponding amount of water, conveniently with demineralised water, and washing the dye solution free of salts in this manner to a low residual salt content. The supply of fresh water is then discontinued and permeate is separated until the desired solids content is achieved. The advantage of this two-step process is that it does not result in the formation of highly viscous thixotropic dye solutions which form readily if the dye solution is too highly concentrated before removal of the bulk of the salts.

To stabilise the dye solution against hydrolysis it is expedient to buffer it to a pH value in the neutral range, preferably in the range from pH 7-8, for example by adding a polyphosphate or a hydrogen/dihydrogen phosphate buffer.

In addition to the buffer, a component that improves the water solubility of the dye may also be added to the concentrated and deionised solution. A suitable component of this kind is, in particular, ε-caprolactam or N-methylpyrrolidone. It is a material advantage of the process of this invention, however, that normally such assistants are not necessary at all or need be added in appreciably smaller amounts than in known formulations.

Further, the dye solutions prepared by the process of this invention may contain smaller amounts (about 1 to 10 g/l in each case) of further assistants that improve the properties of the solutions and which are inert to the reactive dye, for example surfactants, foam inhibitors, antifreeze agents, fungicides and/or microbicides. The invention further relates to the storage stable aqueous solutions of fibre-reactive aminotriazinyl dyes and to the use thereof for the preparation of padding liquors, dyebaths and printing pastes for dyeing and printing natural and regenerated cellulosic fibre materials, especially cotton and viscose, or also nitrogen-containing fibre material, e.g. polyamide.

The dye solutions preferably have the following composition:

10 to 40% by weight of aminotriazinyl dye as lithium-/ammonium salt, 0.5 to 5% by weight, preferably 1.5 to 2% by weight, of polyphosphate or hydrogen/dihydrogen phosphate buffer; the remainder is water.

The salt content of the dye solutions, apart from the buffer salts for stabilising the pH, is appreciably less than 1% by weight.

The dye solutions are of low viscosity and can be kept for several months at temperatures below freezing and up to +40° C. without the formation of agglomerates or a solid sediment. The dye solutions are substantially insensitive to temperature fluctuations and recrystallisation does not occur even on prolonged storage.

The process of the present invention may, for example, be carried out as follows:

The ammonium salt of a sulfo group containing azo dye is dissolved in water. Lithium hydroxide is added to the solution, which is cooled to about 0° C. Cyanuric chloride is added to the cold solution and the pH of the solution is kept in the range from 4 to 6 during the condensation by the addition of lithium hydroxide. When the condensation is complete, further lithium hydroxide is added to the reaction solution, which is heated to about 30°-70° C. over the course of about 5 to 12 hours. The aminotriazinyl dye prepared in this manner is obtained in the form of the mixed lithium/ammonium salt, and is subsequently deionised and concentrated by hyperfiltration.

For deionisation it is necessary to dilute the dye solution (synthesis solution) and, if desired, to adjust the pH to about 6-8. The dye solution is then subjected to hyperfiltration while continuously replacing the separated permeate with fresh water. The hyperfiltration can be carried out in a tube membrane module fitted with an anionically modified membrane, under an operating pressure of 20 to 30 bar. After the dye solution has been substantially deionised (residual salt content <<1% by weight), concentration of the dye solution to a dye content of 20-30% by weight is commenced. Finally, a tripolyphosphate is added as buffer to the dye solution, which is then diluted to commercial tinctorial strength. The ready for use dye solution has a pH of 7-8 and is absolutely storage stable.

In a modification of the process, the sulfo group containing dye, after reaction with the triazine radical, is further reacted with a colourless amine to give the corresponding N-substituted aminotriazine dye. In this process it is expedient to use the starting dye in the form of the ammonium salt and to carry out the condensation with the cyanuric halide and the subsequent reaction with the amine by adding lithium hydroxide. The dye is then obtained in the form of the mixed lithium/ammonium salt. The ratio of the cations to each other can be adjusted in favour of the ammonium component by replacing some of the lithium hydroxide solution employed for the condensation by aqueous ammonia solution. Examples of colourless amines which are condensed with the primary condensation product are aliphatic mono- and dialkylamines containing 1 to 4 carbon atoms in the alkyl moieties, e.g. methylamine, dimethylamine, ethylamine, diethylamine or also hydroxyalkylamines such as β-hydroxyethylamine. Also suitable are aromatic amines such as aniline, toluidine or, in particular, anilinesulfonic acids such as aniline-2-sulfonic acid, aniline-3-sulfonic acid or aniline-4-sulfonic acid.

The invention is illustrated in more detail by the following Examples, in which parts and percentages are by weight, unless otherwise indicated.

EXAMPLE 1

545 parts of the diammonium salt of 3-ureido-4-(3',6',8'-trisulfonaphth-2'-ylazo)aniline are dissolved at room temperature in 5000 parts by volume of water with the addition of 250 parts by volume of 4N lithium hydroxide solution and the solution is then cooled to 0° C. by addition of 1000 parts of ice. Then 185 parts of cyanuric chloride, which has been suspended beforehand in 100 parts of water and 200 parts of ice, are added. The pH of the reaction mixture, which has a temperature of 0°–5° C., is kept in the range from 4.5°–5° C. with aqueous lithium hydroxide. About 250 parts by volume of 4N lithium hydroxide solution are required. The reaction is complete after about 1 hour. Then 500 parts by volume of 4N lithium hydroxide solution are added to the reaction mixture, which is warmed to 40° C. After 9 hours, the aminotriazinyl reactive dye of the following formula (formula 1) is obtained in the form of the mixed lithium/ammonium salt:

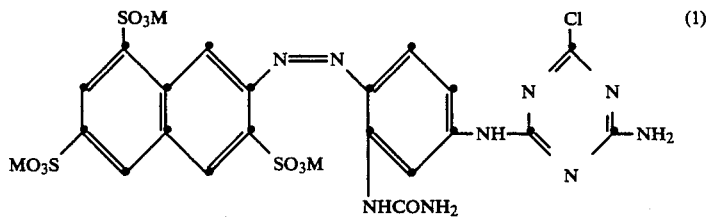

$M = Li^+$ and $NH_4^+$ in the ratio 3:2.

5600 parts of the salt-containing synthesis suspension are subsequently diluted with 600 parts of water (solids content of the suspension: 8.5% by weight, dye content: c. 7% by weight, salt content: 1.5% by weight) and deionised and concentrated in a hyperfiltration unit (membrane surface area: 0.84 m²) The membrane employed is an anionically modified cellulose acetate membrane, the preparation of which is described in German Offenlegungsschrift 25 05 254 and which has a cut-off level of 500. The hyperfiltration is carried out in two steps at a temperature of about 20° C. and under a pressure of 25 bar. The pH of the dye suspension is in the range from 6.5 to 7.5.

First deionisation is effected by adding 6600 parts of demineralised water to the dye suspension and 6600 parts of salt-containing permeate are separated off. The chloride content thereby falls to 0.45% by weight and the dye goes into solution. The dye solution is then concentrated by removing another 4500 parts of permeate, affording 1700 parts of a concentrated dye solution with a solids content of 25% by weight and having a chloride content (lithium chloride, ammonium chloride) of less than 0.1% by weight. The dye is present in solution in a proportion of about 60% as lithium salt and 40% as ammonium salt.

With stirring, 92 parts of the resultant dye solution are buffered with 1.0 part of sodium tripolyphosphate and diluted with 7.0 parts of demineralised water. The chemically and physically stable liquid commercial formulation so obtained has a pH of about 7.5 and the following composition:
23% by weight of dye (Li/NH₄ salt)
1% by weight of sodium tripolyphosphate
76% by weight of water.

The liquid formulation is of low viscosity and remains stable after storage for several months at temperatures in and around freezing point and up to +40° C.

If the procedure described in this Example is repeated exactly, but with the condensation being carried out such that the dye is obtained in the form of the sodium/lithium, potassium, potassium/lithium or ammonium salt, then storage stable formulations are not obtained. Precipitations which are no longer soluble at elevated temperature are formed, especially at storage temperatures of in and around 0° C.

EXAMPLE 2

The procedure of Example 1 is carried out with a solution of 464 parts of the diammonium salt of 3-acetamido-4-(4',8'-disulfonaphth-2'-ylazo)aniline in 4000 parts by volume of water, to give the aminotriazinyl reactive dye of the following formula (formula 2) as lithium/ammonium salt:

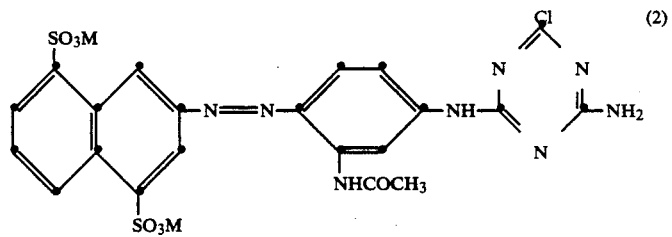

$M = Li^+$ and $NH_4^+$ in the ratio 3:1.

The ratio of $Li^+:NH_4^+$ can be altered by 30% in favour of the ammonium component by partial replacement of lithium hydroxide with ammonium hydroxide.

In the same manner, the following aminotriazinyl reactive dyes are obtained as mixed lithium/ammonium salts (formulae 3 and 4) from the ammonium salts of the corresponding aminoazo dyes:

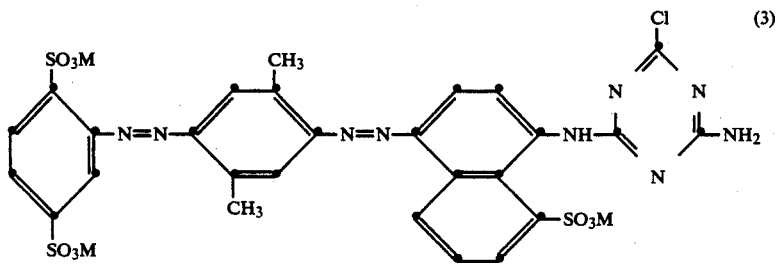

(3)

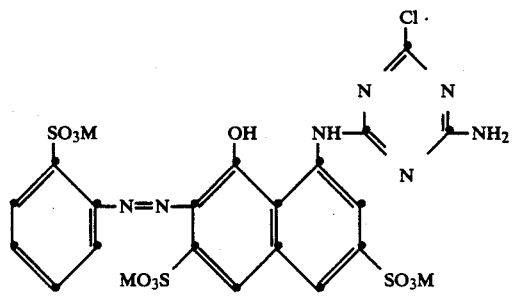

The salt-containing synthesis suspensions of the dyes so prepared are deionised and concentrated by hyperfiltration as described in Example 1. The dye content of the substantially salt-free dye solutions are indicated and compared in the following table with the dye content of corresponding solutions which contain the dye in the form of the sodium salt. The increase in solubility of the dye in the form of the $Li^+/NH_4^+$ salt is clearly observed.

| Dye | Dye as $Li^+/NH_4^+$ salt | Dye as $Na^+$ salt |
|---|---|---|
| 2 | 25% | 18% |
| 3 | 25% | 19% |
| 4 | 23% | 16% |

The liquid formulations prepared with the lithium-/ammonium salts of the dyes 2 to 4 are of low viscosity (viscosity c. 6 to 10 cP at 20° C.) and remain stable after storage for several months at $-10°$ to $+40°$ C.

EXAMPLE 3

531 parts of the dye of formula 5a

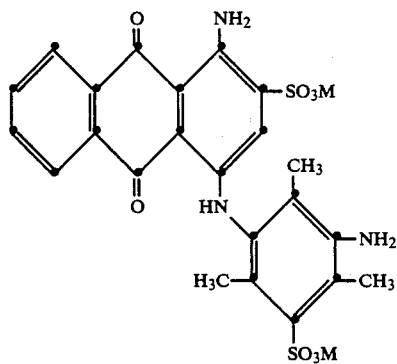

(5a)

in the form of the ammonium salt ($M=NH_4^+$) are dissolved in 4000 parts by volume of water with the addition of 250 parts by volume of a 4N lithium hydroxide solution and condensation is effected with 185 parts of cyanuric chloride as described in Example 1. As soon as the reaction is complete, 173 parts of aniline-3-sulfonic acid, which have been dissolved beforehand in 1000 parts by volume of water with the addition of 250 parts by volume of 4N lithium hydroxide solution, are added. The mixture is then stirred at pH 5.0 and at a the temperature rising to 80° C. About 250 parts by volume of 4N lithium hydroxide solution are required. The reaction is complete after about 2 hours and the reactive dye of the formula 5b

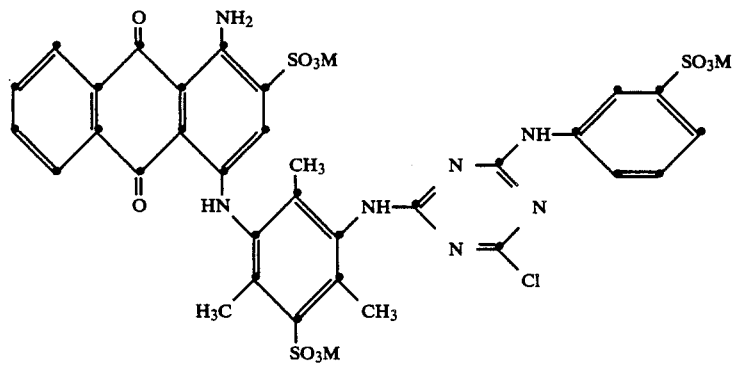

(5b)

is obtained as mixed lithium/ammonium salt. The ratio of $Li^+$:$NH_4^+$, which is at first >1, can be altered at will in favour of the ammonium component by partially replacing the lithium hydroxide solution with ammonia solution in one or both of the reaction steps.

The salt-containing suspension of the crude dye is deionised and concentrated by hyperfiltration as described in Example 1. The concentrated dye solution so obtained has a chloride content of about 0.4% by weight and can be readily processed to a storage stable liquid formulation. The concentration of dye in the solution is 34% and is appreciably higher than that of a solution which has been obtained using a dye of formula (5b) in the form of the sodium salt—such a solution is already saturated at a dye concentration of 27%.

What is claimed is:

1. A process for the preparation of a concentrated aqueous, substantially salt-free solution of an aminotriazinyl reactive dye, which comprises
   (1) reacting cyanuric chloride with an azo dye containing 2 to 5 sulfo groups which are at least partly in the form of an ammonium salt, and one or more radicals capable of reacting with cyanuric chloride, in the presence of lithium hydroxide, and
   (2) deionising and concentrating the salt-containing synthesis solution by hyperfiltration.

2. A process according to claim 3, wherein the colourless amine is an anilinesulfonic acid.

3. A process according to claim 1, wherein the dye which contains sulfo groups, after reaction with the triazine radical, is reacted with a colourless amine.

4. A process according to claim 1, wherein a polyphosphate or hydrogen/dihydrogen phosphate buffer is added to the dye solution after deionisation and concentration.

5. An aqueous dye solution obtained by a process as claimed in claim 1, which contains the aminotriazinyl reactive dye as lithium/ammonium salt in the ratio of lithium:ammonium of 1:1 to 3:1.

6. An aqueous dye solution obtained by a process as claimed in claim 1, which contains 10 to 40% by weight of aminotriazinyl dye as lithium/ammonium salt and 0.5 to 5% by weight of polyphosphate or hydrogen/dihydrogen phosphate buffer.

7. A process for dyeing or printing natural or regenerated cellulosic or nitrogen-containing fibre material, which comprises applying to said fibre material an aqueous dye solution obtained by a process according to claim 1.

8. A process according to claim 7 wherein the cellulosic fibre material is cotton or viscose.

* * * * *